United States Patent [19]

Wührer

[11] Patent Number: 4,525,916
[45] Date of Patent: Jul. 2, 1985

[54] METHOD OF COUPLING COAXIAL SHAFTS

[75] Inventor: Wolfgang Wührer, Ravensburg, Fed. Rep. of Germany

[73] Assignee: Escher Wyss GmbH, Ravensburg, Fed. Rep. of Germany

[21] Appl. No.: 529,135

[22] Filed: Sep. 2, 1983

[30] Foreign Application Priority Data

Sep. 8, 1982 [CH] Switzerland ............... 5332/82

[51] Int. Cl.³ ............................................. B23P 11/02
[52] U.S. Cl. ......................................... 29/446; 29/525; 29/526 R; 403/15; 403/31; 403/314
[58] Field of Search ............ 29/446, 526 R, 525, 29/426.6, 421 R; 403/15, 314, 31

[56] References Cited

U.S. PATENT DOCUMENTS

| | | | |
|---|---|---|---|
| 2,348,293 | 5/1944 | Hamer | 29/446 UX |
| 2,764,437 | 9/1956 | Bratt | 403/15 |
| 2,840,399 | 6/1958 | Harless et al. | 29/446 UX |
| 2,980,474 | 4/1961 | Gargan | 29/446 UX |
| 3,114,566 | 12/1963 | Coberly et al. | 29/426.6 X |
| 3,690,707 | 9/1972 | Van Rooij | 403/15 |
| 4,425,050 | 1/1984 | Durand | 403/15 |
| 4,460,289 | 7/1984 | Lundgren | 403/314 |

FOREIGN PATENT DOCUMENTS

| | | |
|---|---|---|
| 7018465 | 9/1970 | Fed. Rep. of Germany . |
| 983390 | 2/1951 | France . |
| 2014425 | 4/1970 | France . |
| 2228978 | 12/1974 | France . |
| 97284 | 4/1973 | German Democratic Rep. . |
| 6807386 | 12/1968 | Netherlands . |
| 7507258 | 6/1975 | Netherlands . |

OTHER PUBLICATIONS

Publication entitled "The Ok Coupling from SKF Steel".

Primary Examiner—Charlie T. Moon
Attorney, Agent, or Firm—Werner W. Kleeman

[57] ABSTRACT

A shaft coupling and method of operating the same serves to establish a positive and reliable frictional connection or interference fit for the operative torque-transmitting interconnection of two shafts. The shaft coupling has an inner sleeve and an outer sleeve coacting with one another by means of conical surfaces or tapers. The shaft coupling, and particularly the sleeves, especially the outer sleeve has two outer support portions or sections and an intermediate portion or section located therebetween. The support portions are provided with infeed bores for the infeed of a pressurized fluid medium, typically pressurized oil, between the conical surfaces or tapers of the sleeves during the mounting of the shaft coupling. At the intermediate portion of either the outer sleeve or inner sleeve there is located an outflow bore for the withdrawal or discharge of the pressurized oil.

13 Claims, 2 Drawing Figures

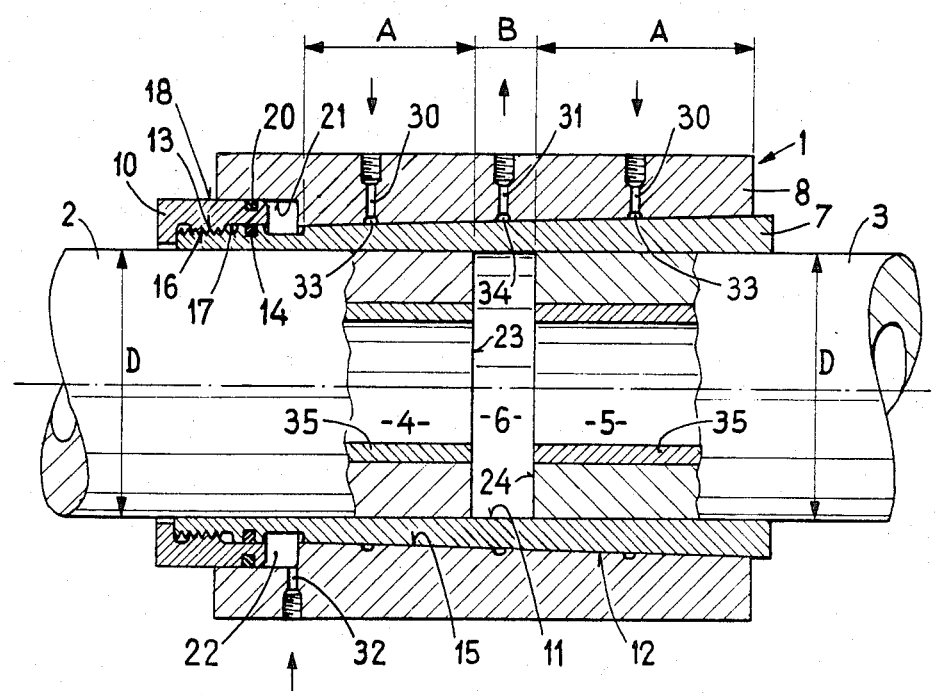
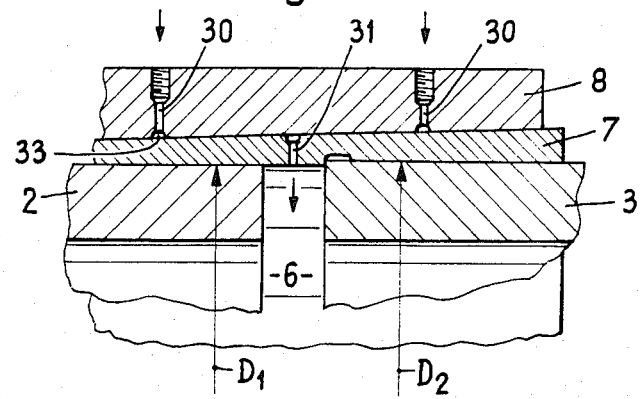

METHOD OF COUPLING COAXIAL SHAFTS

BACKGROUND OF THE INVENTION

The present invention relates to a new and improved construction of a shaft coupling and a method of operating the same in order to positively interconnect with an interference fit or frictionally two shafts which are to be operatively coupled with one another, in order to reliably transmit a rotational moment or torque between such two shafts.

In its more specific aspects, the shaft coupling of the present development serves for the frictional connection of two coaxially arranged shafts each having substantially cylindrical shaft ends or end sections. The shaft coupling contains an inner sleeve or bushing possessing a substantially cylindrical bore having a slight over-dimension in relation to the cylindrical end sections or portions of the shafts and a slightly conical outer surface or taper. Additionally, there is provided an outer sleeve or bushing possessing an inner conical surface or taper which is suitable for coacting with the conical outer surface or taper of the inner sleeve. The outer sleeve is provided with a bore for the infeed of hydraulic medium at a high pressure between the conical surfaces or tapers of the inner and outer sleeves. The outer sleeve can be displaced by using a relatively modest amount of force upon the inner sleeve into an operating or working position in which the inner sleeve is compressed by the outer sleeve and firmly pressed against the end portions or sections of the shafts in such a manner that there is provided a frictional connection between both of the shafts. The outer sleeve has support sections or portions which, in the operating position of the shaft coupling, are intended to encircle the end portions of the shafts. Between such support portions or sections there is located an intermediate portion or section which, in the operating position of the shaft coupling, is located at the region between both of the shafts.

Such types of shaft couplings, among other things, are used for interconnecting propeller shafts of marine vessels with their drive shafts. They have the advantage that there can be avoided the use of keyways, they require very little space and can be easily mounted and again dismantled.

However, the heretofore known constructions of such shaft couplings are associated with the drawback that during the driving-up of the outer sleeve upon the inner sleeve the latter must be supported along its entire length. At the location wherever there is present a gap, typically between the confronting end portions or sections of the shafts to be interconnected, in other words at those locations where the inner sleeve is not supported, the inner sleeve can become damaged by virtue of the high prevailing hydraulic pressures.

Thus, for instance, to counteract or mitigate against this appreciable shortcoming both ends of the shafts which are to be interconnected must be arranged or adapted so as to abut one another without the formation of any intermediate gap therebetween. Under certain circumstances this can require that there be undertaken expensive adaptation or modification work during the mounting of the shaft coupling upon the shafts.

On the other hand, situations are encountered in practice, such as for example in the case of adjustable pitch propellers, where two hollow shafts should be interconnected which contain in their hollow spaces or passageways tubular pipes or conduits. As a general rule, these tubular pipes are provided with pipe couplings at the connection location of both shafts, in order to thus be able to disconnect, by means of such pipe couplings, the propeller along with its propeller shaft completely from the drive shaft.

With the present day constructions of shaft couplings of the aforementioned type it is necessary, in the aforementioned instance, to fit bipartite ring-shaped insertion elements into the intermediate space or gap between both of the shaft ends, in order to provide an effective support of the inner sleeve during the assembly of the shaft coupling which entails drawing or driving-up the outer sleeve along the inner sleeve. Inasmuch as this work only can be performed after the installation of the propeller at the marine vessel it is both cumbersome and expensive.

SUMMARY OF THE INVENTION

Therefore, with the foregoing in mind it is a primary object of the present invention to provide a new and improved shaft coupling and method of operating the same which is not afflicted with the aforementioned drawbacks and limitations of the prior art shaft coupling constructions and the methods of operating the same during the mounting and dismantling of the shaft coupling at and from the shafts to be interconnected.

Another important object of the present invention is directed to a new and improved construction of a shaft coupling of the previously mentioned type which affords a relatively simple, reliable and safe interconnection of two shafts, specifically independent of whether the shafts abut one another without any intermediate space or gap therebetween or whether there is present an intermediate space or gap between these shafts.

Still a further significant object of the present invention is directed to a new and improved construction of shaft coupling for reliably, positively and safely interconnecting in a most simple and effective manner two shafts with one another in order to provide for the transmission of relatively high torques or rotational moments therebetween, which shaft coupling is relatively simple in construction and design, quite economical to manufacture, extremely reliable in operation, easy to use, and affords relatively simple mounting and dismantling of the shaft coupling at the shaft ends of the shafts to be interconnected, without the danger of damaging the shaft coupling even in those situations where the shaft ends do not abut one another and the inner sleeve of the shaft coupling is thus not supported fully over its entire length.

A further important object of the present invention is directed to a new and improved construction of shaft coupling and method of operating the same which allows for the reliable and positive torque-transmitting interconnection of the shaft ends of two shafts which are to be interconnected with one another, without the need for any time-consuming and expensive accommodation or adaptation work to protect the inner sleeve of the shaft coupling against damage due to the fact that it is partially unsupported when the shaft ends are spaced from one another.

Now in order to implement these and still further objects of the invention, which will become more readily apparent as the description proceeds, the shaft coupling of the present development is manifested by the features that, both of the support portions or sections are each provided with at least one bore for the infeed of the pressurized fluid medium, and that at the intermediate portion or section or either the outer sleeve or inner sleeve there is provided at least one outflow or discharge bore for the withdrawal or discharge of the hydraulic pressurized fluid medium.

Although not absolutely crucial it is preferable if the outflow bore or equivalent outflow facility is formed in the outer sleeve or bushing.

However, a constructional embodiment is conceivable wherein the outflow bore or port or the like is formed in the inner sleeve or bushing. When interconnecting hollow shafts, the confronting ends of which are arranged in spaced relationship from one another, the hydraulic pressurized fluid medium can unobstructedly flow-out into the hollow space or passageways of the hollow shafts. This embodiment is particularly advantageous in those instances where the movement or displacement of the outer sleeve upon the inner sleeve, during the mounting of the shaft coupling, is greater than the gap or space between both of the shaft ends. The outflow or withdrawal opening for the pressurized fluid medium can be arranged exactly above such gap or space between the confronting shaft ends.

The inventive shaft coupling can be constructed such that the cylindrical bore or passageway of the inner sleeve is stepped in such a manner that it comprises two substantially cylindrical portions or sections having different diameters, and thus is suitable for the interconnection of shaft ends possessing corresponding diameters. A connection of such type of shaft ends was not possible with the heretofore known constructions of sleeves of the state of the art shaft couplings.

Moreover, the larger diameter cylindrical section or portion of the support section or portion of the inner bushing likewise can be structured to possess a larger diameter. Consequently, there is obtained a shaft coupling whose inner sleeve or bushing can possess the same thickness at both support portions or sections thereof, notwithstanding the conical outer surface or taper of such inner sleeve. This can be advantageous for the design and computation of the dimensions of the shaft coupling.

Preferably, the outflow or discharge bore can have operatively associated therewith a substantially ring-shaped or annular groove. This ring-shaped groove ensures for an essentially uniform outflow or discharge of the hydraulic medium about the circumference of the shaft coupling.

As already alluded to above the invention is not only concerned with the aforementioned novel and improved construction of shaft coupling, but also relates to a unique method of operating such shaft coupling for interconnecting the shaft ends of two coaxially arranged shafts and for releasing the mounted shaft coupling. To that end there is mounted a shaft coupling constructed according to the invention upon the confronting ends of the two shafts which are to be interconnected, the shaft coupling having an inner sleeve or bushing provided with a slightly conical outer surface or taper, and an outer sleeve or bushing provided with an inner conical surface or taper. There is then infed a hydraulic pressurized fluid medium from the region of at least one support portion or section of the shaft coupling located remote from the confronting shaft ends through the contacting surfaces or interface of the tapered inner and outer sleeves, this hydraulic pressurized fluid medium flowing along the interface or contacting surfaces of the inner and outer sleeves towards a region where the hydraulic pressurized fluid medium can experience a reduction in its pressure, e.g. towards atmospheric pressure, this pressure reduction region being located in a plane extending between the confronting shaft ends. By virtue of such flow of the hydraulic pressurized fluid medium at the interface between the contacting surfaces of the inner and outer sleeves, the outer sleeve is raised from the inner sleeve to an extent sufficient to permit displacement or driving of the outer sleeve in a predetermined mounting direction. The outer sleeve is then displaced or driven in such mounting direction, in order to compress the inner sleeve against the confronting ends of the shafts to be interconnected, the flow of hydraulic pressurized fluid medium through the interface between the outer and inner sleeves is discontinued, and the shaft ends are positively interconnected with one another by the shaft coupling. For de-mounting or dismantling the shaft coupling the procedures are essentially the same, except that the outer sleeve is displaced in the opposite direction with respect to the mounting direction.

Advantageously, although not necessarily, the shaft ends are spaced at their confronting ends from one another, although the confronting shaft ends could be arranged in abutting contact with one another at such ends. Moreover, the hydraulic pressurized fluid medium can be advantageously infed from the two support sections or portions of the outer sleeve to the interface between the contacting surfaces of the outer and inner sleeves in opposite directions towards the region where the hydraulic pressurized fluid medium is permitted to undergo a reduction in pressure. In such case the region where the hydraulic pressurized fluid medium is able to experience a reduction in pressure is located intermediate such support sections or regions.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a partial fragmentary sectional view of a first exemplary embodiment of shaft coupling for interconnecting two shafts, here for instance a propeller shaft with a drive shaft; and FIG. 2 is a fragmentary sectional view, similar to the showing of FIG. 1, depicting a different exemplary embodiment of inventive shaft coupling.

DETAILED DESCRIPTION OF THE PREFERRED EMBODIMENTS

Describing now the drawings, it is to be understood that only enough of the construction of the shaft coupling and related shafts which are to be interconnected has been shown in the drawings as needed for those skilled in the art to readily understand the underlying principles and concepts of the present development, while simplifying the showing of the drawings. Turning attention now to the first exemplary embodiment of FIG. 1, it will be seen that the shaft coupling 1 thereof serves to interconnect, for instance, two hollow shafts 2 and 3 with one another. It can be assumed that one of the shafts constitutes, for instance, the propeller shaft of an adjustable pitch propeller and the other shaft constitutes a drive shaft for driving the propeller shaft. In the event that there should be driven an adjustable pitch propeller then the bores or passageways 4 and 5 of the shafts 2 and 3, respectively, are usually provided with not particularly illustrated but conventional tubular pipes or pipe conduits or the like for the infeed and the outfeed or return of a suitable hydraulic pressurized fluid medium, typically oil, in order to actuate the propeller, and even under certain circumstances electrical lines or the like can extend through these bores or passageways 4 and 5 of the shafts 2 and 3. In such environment of use there are provided in the illustrated gap or space 6 between the confronting ends or end faces 23 and 24 of the shafts 2 and 3, respectively, suitable couplings for disconnecting such pipings or conduits during the disassembly of one of the shafts, especially if, for instance, the other shaft should not be positionally shifted.

The exemplary embodiment of shaft coupling 1 depicted in FIG. 1 possess an inner sleeve or bushing 7, an outer sleeve or bushing 8 as well as a closure ring or ring member 10 or equivalent structure.

The inner sleeve or bushing 7 possesses a substantially cylindrical bore or passageway 11 having a slight overdimension of, for instance 0.15 mm in relation to the diameter D of the illustrated but not particularly referenced end sections or portions of the shafts 2 and 3. Additionally, the inner sleeve or bushing 7 has a slightly conical outer surface or taper 12 having a taper of, for instance 1:50 to 1:80. At the smaller end the inner sleeve 7 is provided with external threads or threaded portion 13 as well as with a sealing ring 14.

The outer sleeve or bushing 8 has an inner conical surface of taper 15 which is suitable for coaction with the outer conical surface or taper 12 of the inner sleeve or bushing 7. This means that both the outer and inner sleeves have the same taper, and that the diameter of the inner sleeve 7 is chosen in accordance with the requirements for forming the requisite frictional connection or interference fit and for the release thereof.

The closure ring or ring member 10 is provided with internal threads or threaded portion 16 threaded onto the external threads or threaded portion 13 of the inner sleeve 7. Moreover, the closure ring member 10 possesses a substantially cylindrical bore 17 which merges with the internal threads 16, this cylindrical bore 17 sealingly coacting with the sealing ring or seal structure 14 of the inner sleeve 7. At its outside or outer circumference the closure ring member 10 is provided with a substantially cylindrical surface 18 in which there is mounted a sealing ring 20 or equivalent structure which sealingly coacts with a substantially cylindrical bore 21 formed at the end of the outer sleeve or bushing 8. The substantially cylindrical bore 21 forms in conjunction with the closure ring member 10 a cylinder chamber or space 22, the purpose of which will be described more fully hereinafter.

FIG. 1 depicts the shaft coupling 1 in its operating or work position, i.e. in a position in which the outer sleeve or bushing 8, with the aid of the conical surfaces or tapers 12 and 15, compresses the inner sleeve or bushing 7 in such a manner that the depicted end portions or sections of the shaft 2 and 3 are securely clamped in the inner sleeve 7. This clamping action or interference fit is of such an intensity that the friction which prevails is sufficient for transmitting the requisite rotational moment or torque from the drive shaft to the driven shaft. In this position the shaft coupling 1, and, in particular, its outer sleeve 8 has two support sections or portions A as well as an intermediate section or portion B located therebetween, and such support sections or portions A and intermediate section or portion B may be considered to be likewise co-extensively present at the inner sleeve or bushing 7. The intermediate portion B extends beyond the extent of the intermediate gap or space 6 between the confronting end surfaces 23 and 24 of the shafts 2 and 3, respectively. The support portions or sections A extend from the relevant end surface of the related shaft up to the location where there terminates the clamping action between the sleeves 7 and 8, i.e. beyond the region where the conical surfaces or tapers 12 and 15 contact one another.

As also will be evident by inspecting FIG. 1, there is provided in the outer sleeve or bushing 8, and specifically at locations disposed within the support sections or portions A, infeed bores or openings 30 for the infeed of a suitable pressurized fluid medium, here hydraulic pressurized oil, during the mounting and dismantling of the shaft coupling 1. At one location, which in the operating position of the shaft coupling 1 is located in the intermediate portion or section B, there is arranged an outflow or discharge bore or opening 31 for the hydraulic medium. Into the intermediate space of the bore 21 there opens an infeed bore 32. The infeed bores 30 have operatively associated therewith ring-shaped or annular grooves 33 which ensure for a proper distribution of the infed oil about the circumference of the surface or taper 15. The outflow bore or opening 31 is also provided with an appropriate groove 34, preferably a ring-shaped groove, in order to render possible the uniform outflow of the hydraulic medium about the circumference of the shaft coupling 1.

If it is desired to release the shaft coupling 1 depicted in FIG. 1 in such a manner that the shafts 2 and 3 can be disconnected from one another, then in conventional manner there is infed pressurized oil at an extremely high pressure through the infeed bores 30, whereupon the outer sleeve 8 is moved or driven towards the left of the showing of FIG. 1 upon the conical surface or taper 12 of the inner sleeve 7. Consequently, the clamping action previously exerted upon the inner sleeve or bushing 7 is eliminated, so that such compressible inner sleeve 7 can now again expand and there is released the frictional connection or interference fit between the inner sleeve 7 and the ends or end portions of the shafts 2 and 3. The shaft coupling 1 can be laterally displaced upon the shafts 2 and 3.

On the other hand, if the shaft coupling 1 is to be brought into its operating or work position, by means of which it positively interconnects the shafts 2 and 3 by virtue of the aforedescribed frictional action or interference fit, then the outer sleeve 8 must be positionally mounted or arranged upon the inner sleeve 7 in the depicted operating position. This is accomplished in the manner that here also pressurized oil is infed through the bores 30 and that at the same time other pressurized oil is infed through the bore 32 into the cylindrical chamber or space 22. The pressurized oil introduced through the bores 30 between the interface contacting surfaces of the conical surfaces or tapers 12 and 15 expands the outer sleeve or bushing 8, so that this outer sleeve 8 can be moved upon the conical surface or taper 12 of the inner sleeve 7 in the clamping direction. This movement is accomplished under the driving action of the pressurized oil which is effective in the cylinder chamber or space 22.

These operations are well known in the art from the heretofore known constructions of shaft couplings. On the other hand, according to the invention there is importantly provided the aforementioned outflow or discharge bore 31 or equivalent structure and which is equipped with an annular or ring-shaped groove 34. As previously explained, this outflow or discharge bore 31 is located at the intermediate section or portion B which corresponds to the intermediate gap or space 6 between the end surfaces or ends 23 and 24 of the shafts 2 and 3, respectively. This outflow bore 31 allows for an outflow of the oil, and particularly at that region where the inner sleeve or bushing 7 is not supported and which could otherwise become damaged by the action of the extremely high pressure of the hydraulic medium, which can assume a value of up to approximately 1000 bar. With the previously described mounting of the inventive shaft coupling 1 and as soon as the slightest interfacing gap forms between the conical surfaces or tapers 12 and 15 under the action of the inputted or infed hydraulic medium, such infed hydraulic medium can outflow through the outflow bore 31 and loses its pressure. Therefore, there is unnecessary the previously required exact accommodation or adaptation of the length of the shafts 2 and 3 in such a manner that their end surfaces 23 and 24 abutted one another without any intermediate space or gap therebetween, or the otherwise conventionally employed technique of incorporating an exactly fitted bipartite support ring in the intermediate gap or space 6, both of which constitute extremely expensive measures.

Finally, in FIG. 2 there is depicted a further possible construction of the inventive shaft coupling, wherein there is provided a particular design of the outflow or discharge bore 31 for use with hollow shafts 2 and 3, particularly as encountered in the case of adjustable pitch propellers. In this instance the outflow or discharge bore 31 is formed in the inner sleeve or bushing 7 and opens into the intermediate gap or space 6 between the confronting ends of the shafts 2 and 3.

In such FIG. 2 there has also been indicated the possibility of interconnecting, by means of the inventive shaft coupling, two shafts 2 and 3 having different diameters D1 and D2. Preferably, the inner sleeve or bushing 7 is constructed such that the part of its substantially cylindrical bore or passageway possessing the larger diameter D2 corresponding to the larger shaft diameter D2 is formed in the support section or portion A of the inner sleeve or bushing 7 which likewise possesses the larger diameter.

Also, it is finally to be observed that in the arrangement of FIG. 1 the shafts 2 and 3 are shown provided with pressed-in or shrunk-fitted support sleeves or bushings 35 which ensure for an appropriate reinforcement of the shafts 2 and 3 against the outer or external pressure of the shaft coupling 1.

While there are shown and described present preferred embodiments of the invention, it is to be distinctly understood that the invention is not limited thereto, but may be otherwise variously embodied and practiced within the scope of the following claims.

Accordingly, what I claim is:

1. A method of coupling together confronting end portions of two substantially coaxially arranged shafts, comprising the steps of:
mounting a shaft coupling having coacting inner and outer sleeves with tapered contact surfaces between the inner and outer sleeves such that the end portions of the shafts extend into the inner sleeve which is surrounded by the outer sleeve;
infeeding a hydraulic pressurized fluid medium from a region of at least one support portion of the shaft coupling which is located remote from the confronting end portions of the shafts between the tapered contact surfaces of said inner and outer sleeves;
permitting the infed hydraulic pressurized fluid medium to flow along an interface between said tapered contact surfaces towards a region where the hydraulic pressurized fluid medium can experience a reduction in pressure and which region is located in a plane extending between the confronting end portions of the shafts;
radially moving the outer sleeve away from the inner sleeve due to the action of the infed hydraulic pressurized fluid medium;
axially displacing the outer sleeve in a predetermined mounting direction and compressing the inner sleeve against the confronting end portions of the shafts; and
discontinuing the flow of hydraulic pressurized fluid medium through the interface between said tapered contact surfaces, to thereby positively interconnect the two end portions of the shafts in torque-transmitting relationship with one another.

2. The method as defined in claim 1, further including the step of:
permitting the hydraulic pressurized fluid medium to undergo a reduction in pressure towards atmospheric pressure at said region where the hydraulic pressurized fluid medium experiences said reduction in pressure.

3. The method as defined in claim 1, further including the step of:
infeeding said hydraulic pressurized fluid medium from two of said support portions of the shaft coupling located remote from the confronting end portions of the shafts and to opposite sides of said region where the hydraulic pressurized fluid medium can experience said reduction in pressure.

4. The method as defined in claim 3, further including the step of:
providing said two support portions at said outer sleeve and said region where the hydraulic pressurized fluid medium experiences said reduction in pressure likewise at said outer sleeve.

5. The method as defined in claim 3, further including the step of:
providing said two support portions at said outer sleeve and said region where the hydraulic pressurized fluid medium experiences said reduction in pressure at said inner sleeve.

6. The method as defined in claim 1, further including the step of:
arranging the confronting end portions of said two shafts so as to abut one another.

7. The method as defined in claim 1, further including the step of:
arranging the confronting end portions of said two shafts so as to be spaced from one another.

8. The method as defined in claim 7, wherein:
the spacing between said confronting end portions of said two shafts contains said plane in which there is disposed said region where the hydraulic pressurized fluid medium experiences said reduction in pressure.

9. The method as defined in claim 1, further including the step of:
distributing the infed hydraulic pressurized fluid medium about the circumference of the tapered contact surfaces of the inner and outer sleeves.

10. The method as defined in claim 1, further including the step of:

interconnecting by means of said shaft coupling different diameter end portions of said shafts.

11. The method as defined in claim 1, further including the steps of:

infeeding a hydraulic pressurized fluid medium from said region of said at least one support portion towards said region where the hydraulic pressurized fluid medium can experience a reduction in pressure in order to radially move the outer sleeve away from the inner sleeve due to the action of the infed hydraulic pressurized fluid medium; and then axially displacing the outer sleeve in a direction opposite to said predetermined mounting direction in order to disconnect the end portions of the shaft from the shaft coupling.

12. The method as defined in claim 1, further including the steps of:

using an inner sleeve having stepped portions of different diameter; and by means of said inner sleeve interconnecting end portions of the shafts having different diameters corresponding to said stepped portions of said inner sleeve.

13. The method as defined in claim 12, further including the steps of:

providing the larger diameter stepped portion of said inner sleeve at a region thereof having the larger external diameter.

* * * * *